(12) United States Patent
Kumar et al.

(10) Patent No.: US 7,908,348 B2
(45) Date of Patent: Mar. 15, 2011

(54) DYNAMIC INSTALLATION AND UNINSTALLATION SYSTEM OF RENEWABLE ENERGY FARM HARDWARE

(75) Inventors: Vivek Kumar, Bihar (IN); Hemanth Kumar Anjanappa, Andhra Pradesh (IN); Chery Jose, Kerala (IN); Vinish Puravankara, Kerala (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/627,735

(22) Filed: Nov. 30, 2009

(65) Prior Publication Data
US 2010/0146087 A1 Jun. 10, 2010

(51) Int. Cl.
G06F 15/177 (2006.01)
G06F 15/173 (2006.01)
(52) U.S. Cl. .................... 709/220; 709/224
(58) Field of Classification Search .......... 709/223, 709/227, 220, 224
See application file for complete search history.

(56) References Cited

U.S. PATENT DOCUMENTS

| | | | |
|---|---|---|---|
| 4,908,746 A | 3/1990 | Vaughn | |
| 5,325,522 A | 6/1994 | Vaughn | |
| 5,603,034 A | 2/1997 | Swanson | |
| 5,604,892 A | 2/1997 | Nuttall et al. | |
| 6,185,733 B1 | 2/2001 | Breslau et al. | |
| 6,754,885 B1 | 6/2004 | Dardinski et al. | |
| 6,799,080 B1 | 9/2004 | Hylden et al. | |
| 6,880,086 B2 * | 4/2005 | Kidder et al. | 713/191 |
| 7,251,812 B1 | 7/2007 | Jhanwar et al. | |
| 7,382,260 B2 * | 6/2008 | Agarwal et al. | 340/572.1 |
| 7,461,374 B1 | 12/2008 | Balint et al. | |
| 2003/0038842 A1 | 2/2003 | Peek et al. | |
| 2004/0220959 A1 | 11/2004 | Rothman et al. | |
| 2007/0055756 A1 * | 3/2007 | Richards et al. | 709/223 |
| 2007/0094608 A1 | 4/2007 | Getsch | |
| 2007/0118626 A1 * | 5/2007 | Langen | 709/221 |
| 2009/0110539 A1 | 4/2009 | Uphues | |

FOREIGN PATENT DOCUMENTS

| | | |
|---|---|---|
| WO | 2005-008349 | 1/2005 |
| WO | 2005-069133 | 7/2005 |

OTHER PUBLICATIONS

Scott Lysle, Auto-Update as a Simple Custom Control, Source: Mindcracker Network (www.c-sharpcorner.com), Mar. 2, 2007 http://www.c-sharpcorner.com/UploadFile/scottlysle/CCAutoRefresh03022007020634AM/CCAutoRefresh.aspx.
Configure Automatic Updates by Using Group Policy, Microsoft TechNet, (c)2009 Microsoft Corporation, http://technet.microsoft.com/en-us/library/cc720539.aspx.
GE Wind Energy, Overview of Windfarm Communications Using DNP3, NREL Nov. 17, 2003 (PowerPoint Presentation).

(Continued)

*Primary Examiner* — Benjamin R Bruckart
(74) *Attorney, Agent, or Firm* — McNees Wallace Nurrick LLC (57) ABSTRACT

A system for dynamic installation or uninstallation of a plurality of hardware components of a renewable energy software system, including a reviser including a hardware configuration database, at least one communication device that allows the plurality of hardware components to communicate with the hardware configuration database containing hardware configuration data for the plurality of hardware components, and a plurality of real time objects in the renewable energy software system that represent the plurality of hardware components, wherein the plurality of real time objects are automatically updated by the hardware configuration database at runtime.

18 Claims, 8 Drawing Sheets

OTHER PUBLICATIONS

Kimberly L. Tripp, Auto update statistics and auto create statistics -should you leave them on and/or turn them on, Aug. 24, 2008 http://www.sqlskills.com/blogs/Kimberly/post/Auto-update-statistics-and-auto-create-statistics-should-you-leave-them-on-andor-turn-them-on.aspx.

Eva Kwan et al., Automatic Database Configuration for DB2 Universal Database: Compressing years of Performance Expertise into Seconds of Execution, IBM Canada, Toronto Laboratory, (2003), http://citeseerx.ist.psu.edu/viewdoc/summary?doi=10.1.1.5.1454.

Burleson Consulting, Automatic Database Diagnostic Monitor (ADDM), (2006) http://www.dba-oracle.com/plsql/t_plsql_addm.htm.

Gary Moore et al., An Open Architecture Distributed SCADA System For The Wind Energy Industry, (2004), pp. 1-9.

* cited by examiner

DYNAMIC INSTALLATION AND UNINSTALLATION SYSTEM OF RENEWABLE ENERGY FARM HARDWARE

FIELD

The present disclosure is directed to a system for the dynamic installation and uninstallation or removal of renewable energy hardware components into or from a renewable energy farm or plant (such as a wind farm or solar farm), and methods of dynamically installing or uninstalling or removing renewable energy farm hardware components into or from a renewable energy farm.

BACKGROUND

Recently, renewable energy sources such as wind turbines and solar panels have received increased attention as an environmentally safe, relatively inexpensive, and sustainable alternative energy source compared to traditional coal or gas powered energy sources for power generation. With this growing interest, considerable efforts have been made to develop utility scale wind farms and utility scale solar farms that capitalize on the benefits of these renewable energy sources.

As wind power and solar power become more readily available sources of sustainable energy, more and more utilities and private groups are putting in wind farms and solar farms to provide energy to the grid. As a result of the increased need and legislative mandate for wind farms and solar farms as a source of renewable and sustainable energy, more wind farms and solar farms are being built. The current systems and processes for installing and maintaining new wind turbines to wind farms or solar panels to solar farms suffer from certain drawbacks.

Typically, a wind farm is commissioned in steps, adding one wind turbine at a time. Each turbine is connected to the wind farm by loading information about that particular turbine into the wind farm system software, which is then rebooted so that it will recognize the wind turbine. This process is repeated for each wind turbine that is added to the wind farm. A major drawback is that each time a wind turbine is added to the wind farm, the wind farm software system must be rebooted to recognize the newly added wind turbine. Although installed turbines continue to run during the reboot period, there is no data acquisition done by the wind farm software system during this reboot period and valuable data regarding the wind farm and its operating conditions is lost. Additionally, during the reboot period, critical wind farm system alarms may go unnoticed. Furthermore, current wind farm software systems only read the wind farm hardware configuration data at the startup to generate real time objects. Any hardware configuration change in the wind farm hardware configuration database after the startup does not get reflected in the real time objects until the wind farm software system is restarted or rebooted.

Similarly, a solar farm is also commissioned in steps, adding one solar panel to the solar panel array at a time and then connecting the individual solar panels or array to an inverter. Each solar panel is connected to the solar farm by loading information about that particular solar panel and corresponding inverter into the solar farm software system, which is then rebooted so that it will recognize the solar panel and inverter. This process is repeated for each solar panel or array of solar panels and inverters that is added to the solar farm. A major drawback is that each time a solar panel is added to the solar farm, the solar farm software system must be rebooted to recognize the newly added solar panel. Although the installed solar panels/arrays and inverter configurations continue to run during the reboot period, there is no data acquisition done by the solar farm software system during this reboot period and valuable data regarding the solar farm and its operating conditions is lost. Additionally, during the reboot period, critical solar farm system alarms may go unnoticed. Furthermore, current solar farm software systems only read the hardware configuration data at the startup to generate real time objects. Any hardware configuration change in the solar farm hardware configuration database after the startup does not get reflected in the real time objects until the solar farm software system is restarted or rebooted.

What is needed is a system that allows for the dynamic installation, uninstallation, or maintenance of hardware components of a renewable energy farm at runtime. What is also needed is a method for dynamically installing or uninstalling hardware components of a renewable energy farm. An additional need includes a system and method that allows for maintenance or updates on one or more hardware components of a renewable energy farm without requiring shut down of the whole renewable energy software system for the maintenance or update to take effect in the renewable energy system software.

SUMMARY OF THE DISCLOSURE

One aspect of the present disclosure includes a system for dynamic installation or uninstallation of a plurality of hardware components of a renewable energy software system, including a reviser including a hardware configuration database, at least one communication device that allows the plurality of hardware components to communicate with the hardware configuration database containing hardware configuration data for the plurality of hardware components, and a plurality of real time objects in the renewable energy software system that represent the plurality of hardware components, wherein the plurality of real time objects are automatically updated by the hardware configuration database at runtime.

Another aspect of the present disclosure includes a method for dynamic installation of a plurality of renewable energy farm hardware components into a renewable energy software system, including: providing the plurality of hardware components to be installed in a renewable energy farm; providing a reviser, wherein the reviser further includes a hardware configuration database and a graphical user interface in communication with the hardware configuration database; providing a communication device to send a hardware component status signal to the hardware configuration database; sending the hardware component status signal of the hardware component from the communication device to the hardware configuration database; receiving the hardware component status signal at the hardware configuration database; updating a plurality of hardware configuration data that corresponds to the plurality of hardware components in the hardware configuration database based on the hardware component status signal, wherein the hardware configuration database is configured to automatically initiate a change in a plurality of real time objects of the renewable energy software system; and automatically initiating a change in the plurality of real time objects of the renewable energy farm software system to reflect the installation of the plurality of hardware components at runtime.

Another aspect of the present disclosure provides a method for the dynamic uninstallation of a plurality of renewable energy farm hardware components from a renewable energy software system, including: providing a reviser, wherein the reviser further includes a hardware configuration database and a graphical user interface in communication with the hardware configuration database; providing an option to uninstall the plurality of hardware components through the graphical user interface; selecting the option to uninstall the plurality of hardware components; providing a communication device to send a hardware component status signal to the hardware configuration database; sending the hardware component status signal of the hardware component from the communication device to the hardware configuration database; receiving the hardware component status signal at the hardware configuration database; updating hardware configuration data of the hardware configuration database based on the hardware component status signal, wherein the hardware configuration database is configured to automatically initiate a change in a plurality of real time objects of the renewable energy software system; and automatically initiating a change in the plurality of real time objects of the renewable energy software system to reflect the removal of the plurality of hardware components at runtime.

One advantage of the present disclosure is that the system and method described herein allows for the dynamic installation of hardware components into a renewable energy software system, such as a wind farm software system or a solar farm software system, at runtime without reboot of the wind farm software system or solar farm software system.

Another advantage of the present disclosure is that the system and method allows for the dynamic removal of hardware components from a renewable energy software system, such as a wind farm software system or a solar farm software system, at runtime without reboot of the wind farm software system or the solar farm software system.

Yet another advantage of the present disclosure is a system and method which provide a convenient and easy to use renewable energy farm commissioning system that can be used in incremental steps.

Another advantage of the present disclosure is a system and method to start the wind farm level or solar farm level software system which eases the operation of wind farm or solar farm right from the day of the commissioning of the very first turbine in the wind farm or the very first solar panel in the solar farm.

An additional advantage of the present disclosure is that the system and method are easy to use and implement into existing wind farm software systems or solar farm software systems.

Other features and advantages of the present disclosure will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION

As used herein, the term "renewable energy" is intended to be representative of renewable energy sources such as wind energy, solar energy, and combinations of wind and solar energy, and any associated hardware of software components hardware of a wind farm or solar farm. As used herein, the term "reviser" is intended to be representative of a system that allows for updates or changes to occur in the renewable energy software system at runtime, and typically includes a hardware configuration database and can further include a graphical user interface. A reviser is typically added to an existing renewable energy software system of a wind farm or solar farm to allow a user to dynamically install or dynamically uninstall or remove hardware components from the renewable energy software system during runtime. By "dynamic installation" it is meant that a hardware component is added to the renewable energy software system of a wind farm or solar farm while the renewable energy software system is running without having to reboot or shut down the renewable energy software system or the entire renewable energy farm. By "dynamic uninstallation" it is meant that a hardware component is removed or excluded from the renewable energy software system of a wind farm software system or a solar farm software system while the renewable energy software system is running without having to reboot or shut down the renewable energy software system or the entire farm. As used herein, the term "interactive editor" is intended to be representative of an interface, such as a touch screen, display screen, hand-held wireless device, laptop, desktop computer, or any other device having a keyboard, mouse, or other input device connected to an operating system or other means that will allow a user to see a display or display screen to enter, view, and manipulate real time objects of the wind farm software. As used herein, the term "I/O signal" is an input or output signal from any component of the system such as a hardware component or a software component to another component of the system. As used herein, the term "real time objects" are intended to be representative of a runtime instance of a programming entity having an entry corresponding to each attached renewable energy hardware component. Generally, "real time object" represents a wind turbine hardware component or a solar farm hardware component and is internal to the design of the wind farm software system or solar farm software system. By "runtime" it is meant that the renewable energy software system is being executed without any restarts or reboots of the renewable energy software system program.

Figure 1:
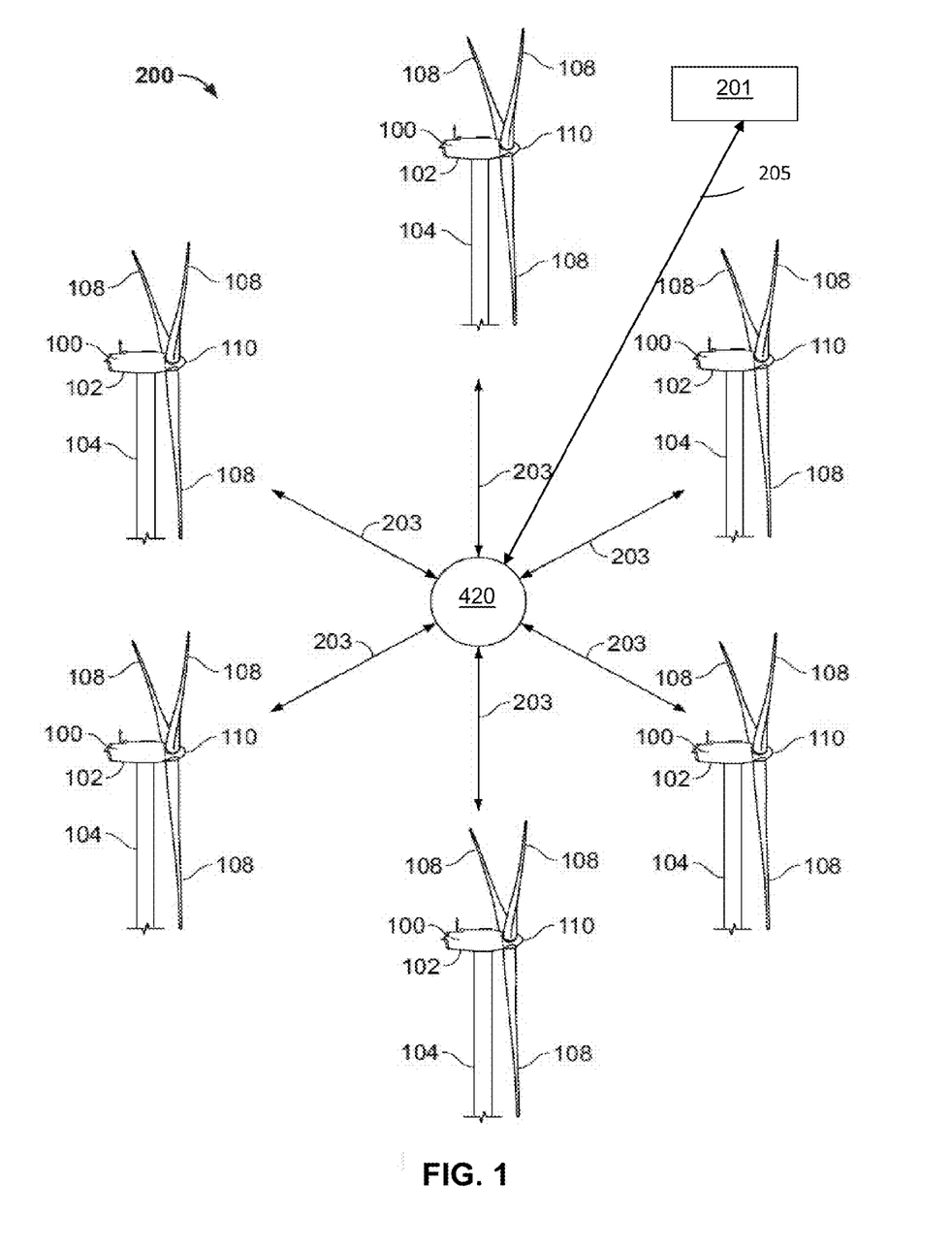
FIG. 1 shows a dynamic installation and uninstallation system of a wind farm according to an embodiment of the present disclosure.

As shown in FIG. 1, a wind turbine 100 generally comprises a nacelle 102 housing a generator (not shown). Nacelle 102 is a housing mounted atop a tower 104. The wind turbine 100 may be installed on any terrain providing access to areas having desirable wind conditions. The terrain may vary greatly and may include, but is not limited to, mountainous terrain or off-shore locations. Wind turbine 100 also comprises a rotor that includes one or more wind turbine rotor blades 108 attached to a rotating hub 110. A plurality of wind turbines 100 can be inter-connected to form a wind farm or plant 200. Wind turbines 100 preferably communicate with wind farm reviser 201 via a communications device 420. Wind turbines 100 send I/O signals 203 via the communication device 420 to wind farm reviser 201. Communication device 420 can be a modem, bus, wireless router, hardware microcontroller, or any other device that allows I/O signals 203 to travel to and from the wind turbines 100 to provide the status of the wind turbine 100 to the wind farm reviser 201.

Figure 2:
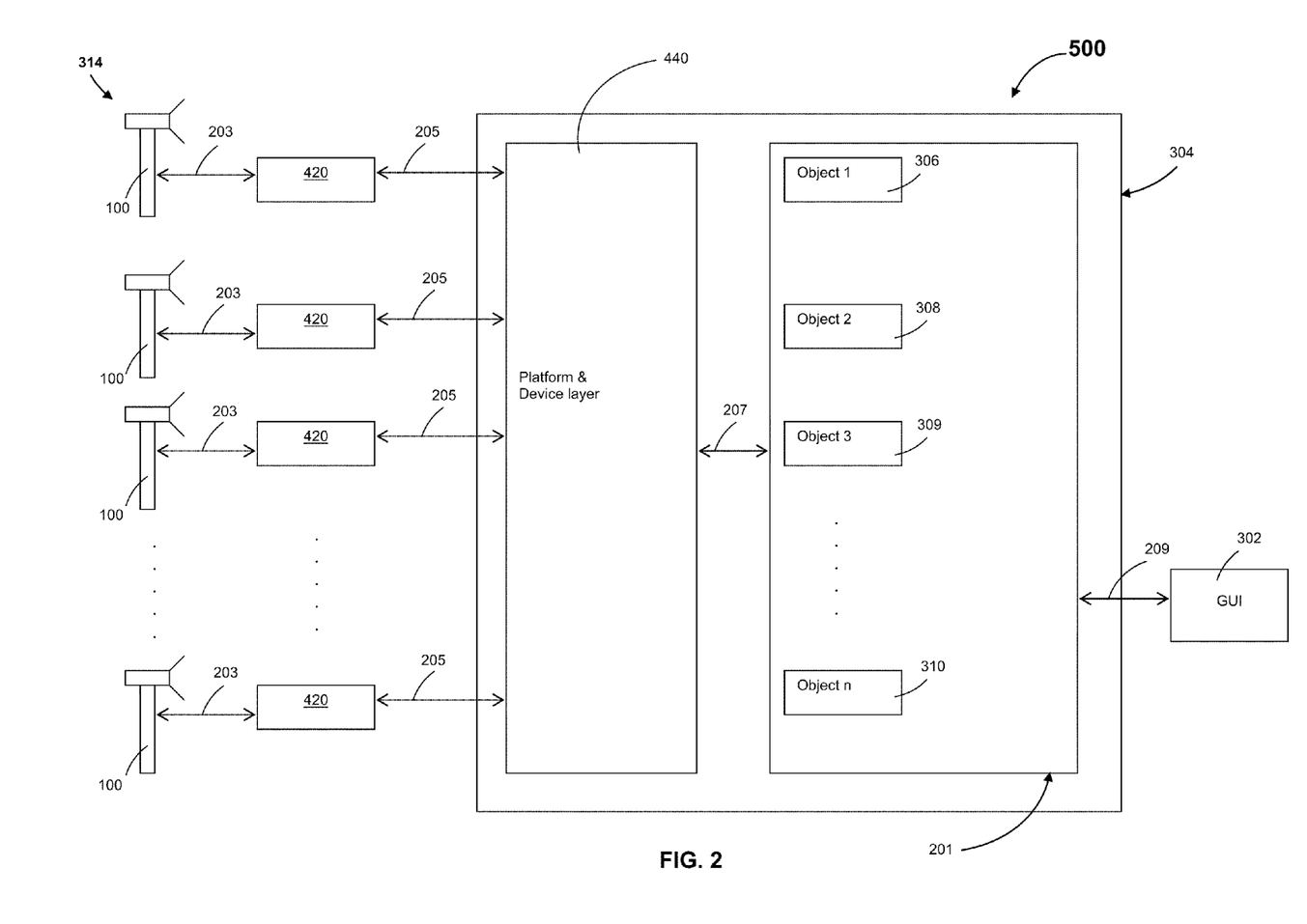
FIG. 2 is a block diagram of an exemplary configuration of the dynamic installation and uninstallation system of a wind farm according to an embodiment of the present disclosure.
Figure 3:
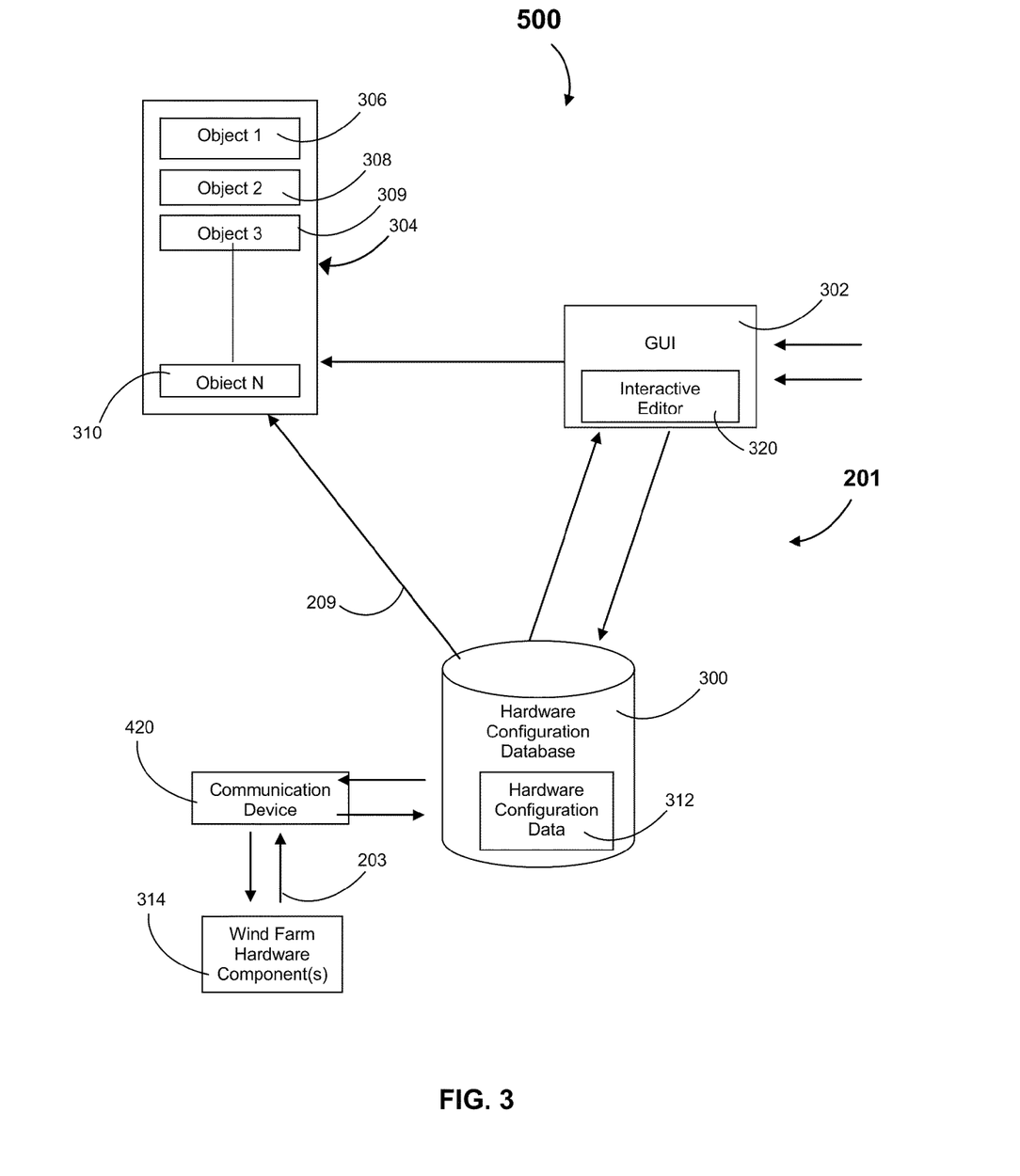
FIG. 3 is a block diagram of an exemplary configuration of the dynamic installation and uninstallation system of a wind farm of the present disclosure.

FIGS. 2 and 3 are pertaining to block diagrams of an exemplary configuration of a dynamic installation and uninstallation system 500 according to an embodiment of the present disclosure. In the present embodiment, the plurality of hardware components, here a plurality of wind turbines 100, send and receive I/O signals 203 to or from a communications device 420, here a plurality of wind farm hardware microcontrollers. In the present embodiment, the plurality of hardware microcontrollers 420 correspond with the plurality of wind turbines 100 in wind farm 200. The plurality of hardware microcontrollers 420 communicate and receive information to or from wind farm platform and device layer 440 about a corresponding wind turbine 100 via an I/O signal 205. Wind farm platform and device layer 440 is preferably part of the SCADA software system of wind farm, and acts as a bridge between wind farm hardware components 314 (see FIG. 3) and wind farm software system 304. Wind farm platform and device layer 440 installs wind farm hardware components 314 and any associated drivers for wind farm components 314 into wind farm software system 304. Wind farm platform and device layer 440 configures the IP addresses for hardware microcontrollers 420 and libraries pertaining to hardware microcontrollers 420, and downloads this configuration to hardware microcontrollers 420. Wind farm platform and device layer 440 facilitates the communication between the centralized server of wind farm 200 and hardware microcontrollers 420, and acts a bridge between wind farm hardware components 314 and wind farm software system 304. The centralized server contains real-time data, historical data, and configuration data of wind farm software system 304. In real time, wind farm software system 304 collects data from wind farm hardware components 314 and collects data from wind farm interactive editor 320. Wind farm software system 304 displays the collected data in wind farm GUI 302, where a user can view and manipulate this real-time data as needed. The historical data collected and stored in the historical database can be viewed by a user in wind farm GUI 302 based on user input. Wind farm configuration database 300 maintains wind farm hardware configuration data 312 for the plurality of wind farm hardware components 314. Examples of wind farm configuration data 312 includes, but is not limited to, wind turbine number, wind turbine type, IP address, and signal names. Platform and device layer 440 communicates via I/O signal 207 with wind farm reviser 201 data retrieved from hardware microcontrollers 420. Additionally, platform and device layer 440 sends instructions from wind farm reviser 201 to hardware microcontrollers 420 via I/O signal 205. I/O signals 207 containing information from wind farm platform and device layer 440 about wind turbines 100 prompts wind farm reviser 201 to create a plurality of real time objects 306, 308, 309, 310 in wind farm software system 304. The technical effect is that when wind farm hardware component 314, such as a wind turbine 100 is added to wind farm 200, wind farm platform and device layer 440 detects added wind turbine 100 through microcontrollers 420 and sends an I/O signal 207 to wind farm reviser 201 to create a plurality of real time objects 306, 308, 309, and 310. First real time object 306, second real time object 308, third real time object 309, and $n^{th}$ real time object 310 are images in the wind farm software system 304 that represent a hardware component 314, such as a wind turbine 100. Wind farm reviser 201 updates and communicates with wind farm GUI 302 via I/O signal 209. Wind farm GUI 302 provides a user interface in which plurality of real time objects 306, 308, 309, and 310 of wind farm software system 304 can be viewed or manipulated by the user. Wind farm GUI 302 can be a web-based application or stand alone application and can include auxiliary devices and interface software.

As shown in FIG. 3, a system 500 for the dynamic installation or removal of a plurality of wind farm hardware components 314 into or from a wind farm software system 304 at runtime is provided. System 500 includes a wind farm reviser 201, a communication device 420, a plurality of real time objects 306, 308, 309, and 310 in the wind farm software system 304, and the plurality of wind farm hardware components 314. Wind farm reviser 201 further includes a wind farm hardware configuration database 300 and a wind farm graphical user interface (GUI) 302. Wind farm GUI 302 further includes a wind farm interactive editor 320. In the present embodiment, wind farm interactive editor 320 is a touch screen, hand-held wireless device, laptop, desktop computer, or any other device having a keyboard or mouse with an operating system that will allow a user to see a display to enter, view, and manipulate the real time objects 306, 308, 309, and 310 of wind farm software system 304. The plurality of real time objects 306, 308, 309, and 310 are represented in the display of wind farm interactive editor 320 by a graphical depiction or symbol for the appropriate corresponding wind farm hardware component 314 that each real time object represents. Examples of wind farm hardware components 314 include, but are not limited to, wind turbines 100, hardware microcontrollers 420, wind farm management system components, and meteorological mast components.

In the present embodiment, wind farm GUI 302 and wind farm interactive editor 320 are connected to a wind farm hardware configuration database 300. Wind farm hardware configuration database 300 stores, updates, and manages wind farm hardware configuration data 312 for the plurality of wind farm hardware component 314. Examples of wind farm hardware configuration data 312 stored in the wind farm hardware configuration database 300 are name, Internet Protocol (IP) address, and description of wind farm hardware components 314. Wind farm communication device 420 allows the wind farm hardware components 314 to automatically communicate with and update the wind farm hardware configuration database 300 which contains wind farm hardware configuration data 312 corresponding to the plurality of wind farm hardware components 314.

In the present embodiment, the plurality of real time objects, i.e. first object 306, second object 308, third object 309, through $n^{th}$ object 310, represent a different wind farm hardware component 314 in the wind farm software system 304, wherein n is any integer. There can be any number of real time objects represented in the wind farm software system 304. Real time objects 306, 308, 309, and 310 are automatically updated by wind farm hardware configuration database 300 whenever there is an addition, change, update, or deletion of wind farm hardware configuration data 312 in the wind farm software system 304. Wind farm reviser 201 provides a user with variety of different avenues to allow the automatic update of wind farm software system 304 at runtime.

In the present embodiment, wind farm interactive editor 320 also provides a point where the user can enter, view, and manipulate wind farm hardware configuration data 312. Wind farm interactive editor 320 provides the user with an interface to make additions, modifications, and remove wind farm hardware configuration data 312 that would correspond to an addition, modification, or removal of wind farm hardware component 314.

In the present embodiment, a wind farm component 314, for example a wind turbine 100, is added to wind farm 200. To install wind turbine 100, a user can select a graphical depiction of a wind turbine from wind farm interactive editor 320 of wind farm reviser 201 and "add" this wind farm hardware component 314 to wind farm 200. This user action of "adding" wind farm hardware component 314 via interactive editor 320 generates a signal 209 to automatically update wind farm hardware configuration database 300 to read wind farm hardware configuration data 312 for the "added" wind farm hardware component 314. For example, I/O signal 209 causes wind farm hardware configuration database 300 to look for the IP address for the "added" wind farm component 314. Wind farm hardware configuration database 300 automatically generates a command to update, look for, or create a real time object, for example, first object 306 of wind farm software system 304 that would correspond to the "added" wind farm hardware component 314.

In an alternative embodiment, wind farm hardware component 314, for example a wind turbine 100, is "pushed into" wind farm 200 by assigning an IP address to wind turbine 100. The wind turbine 100 is "pushed into" wind farm software system 304 instead of being "added" by a user via the wind farm interactive editor 320. The IP address allows wind turbine 100 to send a signal 203 to wind farm communication device 420, which then sends an update to wind farm hardware configuration database 300 of wind farm reviser 201 to update wind farm hardware configuration data 312 to show wind turbine 100 as being "online" in wind farm software system 304. "Online" is understood to mean that the wind turbine 100 is available in wind farm software system 304. Wind farm hardware configuration database 300 also updates real time object 306 that corresponds to wind turbine 100 in wind farm software system 304 to show that wind turbine 100 is "online" in wind farm software system 304. Wind farm hardware configuration database 300 additionally updates wind farm GUI 302 and wind farm interactive editor 320 to display the added wind turbine 100 so the user can see the "pushed" wind turbine 100 and edit wind turbine 100 in wind farm software system 304.

In another alternative embodiment, wind farm hardware component 314, is taken "offline" or uninstalled for maintenance by wind farm reviser 201. "Offline" is understood to mean that wind farm hardware component 314 is not available in the wind farm software system 304, as such a user cannot monitor or command "offline" or uninstalled wind farm hardware components 314 from interactive editor 320 of wind farm GUI 302. The user takes wind farm hardware component 314 "offline" by selecting the option in the wind farm interactive editor 320 of wind farm GUI 302. Wind farm GUI 302 sends update to wind farm hardware configuration database 300, which updates wind farm hardware configuration data 312 that corresponds to that wind farm hardware component 314. Additionally, wind farm hardware configuration database 300 updates the corresponding real time object (i.e. 306, 308, 309, and 310) of wind farm software system 304. Wind farm hardware configuration database 300 also sends a signal via wind farm communication device 420 to bring wind farm hardware component 314 "offline" or to shut down wind farm hardware component 314 for maintenance.

In an additional embodiment, wind farm hardware component 314, is taken "offline" or uninstalled for maintenance at wind farm hardware component 314. Wind farm hardware component 314 sends I/O signal 203 via wind farm communication device 420 to update wind farm hardware configuration database 300 of reviser 201. Wind farm reviser 201 uses the steps set forth above to communicate this change in status to wind farm software system 304 and update wind farm interactive editor 320 so that the display screen shows the status of wind farm hardware component 314 to the user.

In another embodiment, wind farm hardware component 314 can be removed from wind farm software system 304. There are at least two ways that the wind farm hardware component 314 can be "removed" from wind farm 200. A user can "remove" the wind farm hardware component 314 from wind farm software system 304 or the wind farm hardware component 314 is physically "removed" from wind farm 200. When a user "removes" wind farm hardware component 314 from wind farm software system 304, wind farm interactive editor 320 provides the user with the option to select the level of removal of wind farm hardware component 314. Wind farm interactive editor 320 provides the option of removing wind farm hardware component 314 from wind farm software system 304, i.e., when wind farm 200 is decommissioned. Wind farm interactive editor 320 also provides the option of removing some characteristics or portions of wind farm hardware component 314, i.e., when a part is replaced on wind farm hardware component, or to completely remove wind farm hardware component 314 from wind farm hardware configuration database 300. Any changes made by the user to wind farm hardware component 314 in wind farm interactive editor 320 of reviser 201 automatically updates wind farm hardware configuration database 300, wind farm hardware configuration data 312, and real time objects 306, 308, 309, and 310 of wind farm software system 304.

Additionally, wind farm reviser 201 includes a security level control, which provides different user access levels. Wind farm reviser 201 assigns different security clearance and user attributes to different users at sign-on. For example, a system administrator would have greater access to wind farm reviser 201 code and capabilities than a user that is a system operator. Additionally, security levels can be varied based on different job duties and responsibilities at wind farm 200. In an additional embodiment, wind farm reviser 201 can limit the number of wind turbines 100 that may be installed into wind farm 200 based on the number of licenses that are available to that site.

Figure 4:
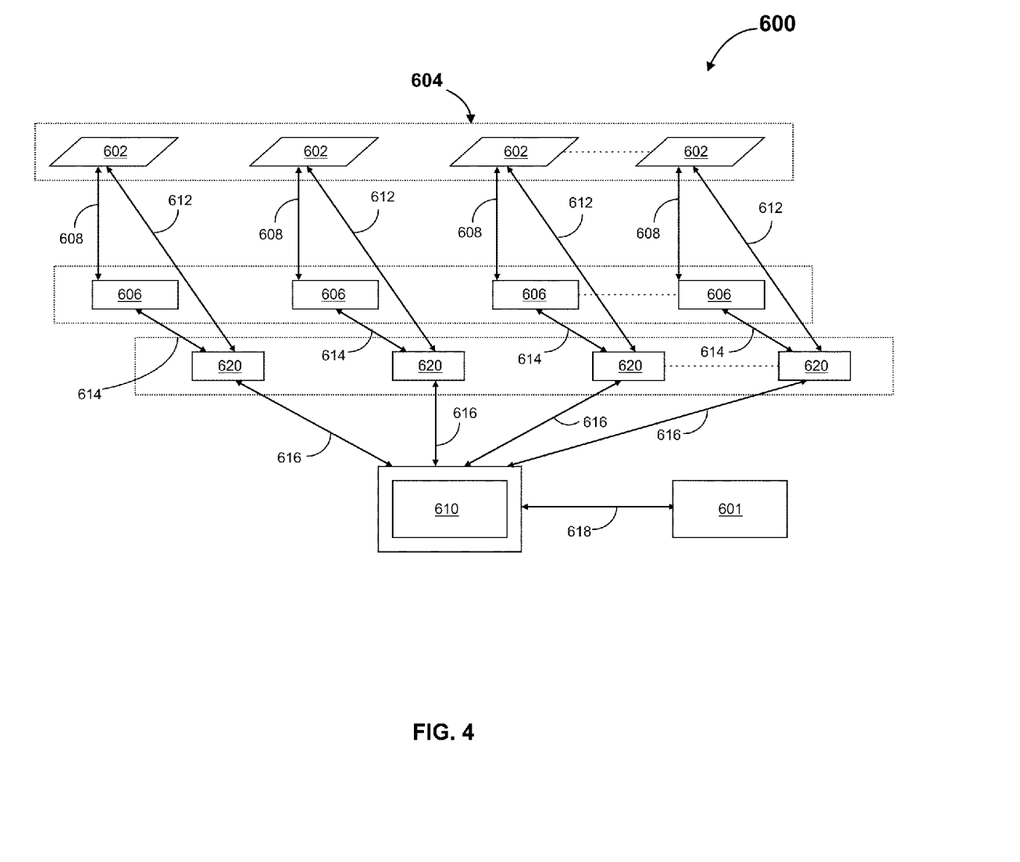
FIG. 4 shows a dynamic installation and uninstallation system of a solar farm according to an embodiment of the present disclosure

As shown in FIG. 4, a solar farm 600 generally includes a plurality of solar panels 602 interconnected to form an array 604. The number of solar panels 602 in the plurality of solar panel arrays 604 in the solar farm 600 varies depending on desired power requirements. A plurality of solar arrays 604 are inter-connected to provide the desired power output for solar farm 600. The plurality of solar panels 602 are connected to at least one inverter 606 to convert the D/C current created by solar panels 602 to A/C current that is useable on the grid. The plurality of solar panels 602 communicate with inverters 606 via I/O signal 608. The number of inverters 606 varies depending on the desired power requirements and the size of the inverter 606. In the present embodiment, one inverter 606 is used for approximately 250 MW of power generated from plurality of solar panels 602. Solar panels 602 send and receive I/O signals 612 to and from solar farm communication device 620. Inverters 606 send and receive I/O signals 614 to and from solar farm communication device 620. Solar farm communication device 620 can be a modem, bus, wireless router, hardware controller, microcontroller, PLC or any other device that allows I/O signals 612, 614, 616 to travel to and from the solar farm hardware components 818 to provide the status of the solar farm hardware components 818 to the solar farm reviser 601. In the present embodiment, solar farm communications device 620 is a programmable logic controller (PLC). PLCs 620 send and receive I/O signals 616 to and from solar farm automation server 610. Solar farm automation server 610 sends and receives I/O signals 618 to and from solar farm reviser 601. Examples of solar farm hardware components 818 (see FIG. 6) include, but are not limited to, solar panels 602, solar arrays 604, and inverters 606, that communicate with solar farm reviser 601 via PLCs 620.

Figure 5:
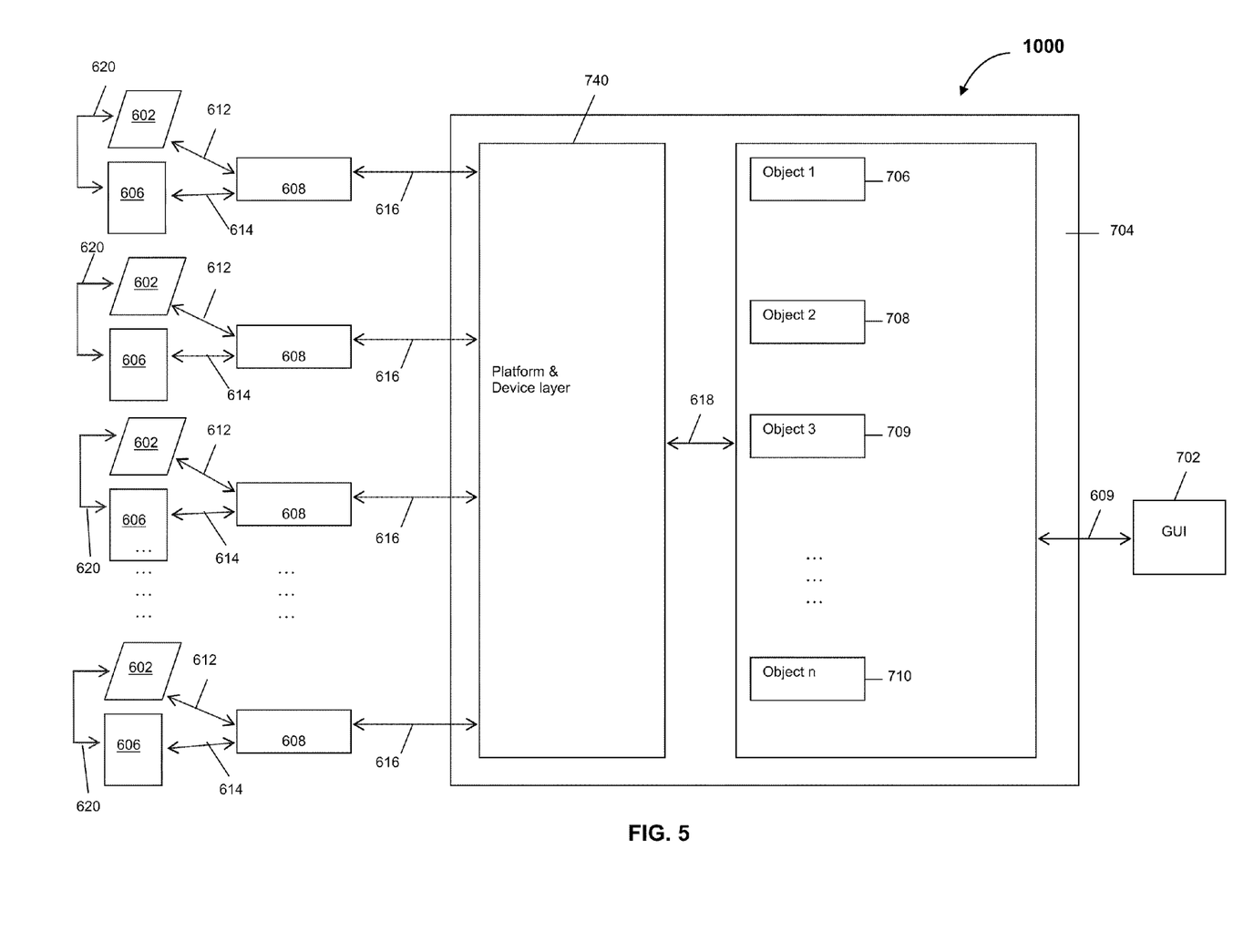
FIG. 5 is a block diagram of an exemplary configuration of the dynamic installation and uninstallation system of a solar farm according to an embodiment of the present disclosure.

FIG. 5 is a block diagram of an exemplary configuration of a dynamic installation and uninstallation system 1000 according to an embodiment of the present disclosure. In the present embodiment, the plurality of hardware components 818, here a plurality of solar panels 602 and inverters 606, send and receive I/O signals 612, 614 to or from a plurality of PLCs 620. A plurality of PLCs 620 communicates and receives information to or from solar farm platform and device layer 740 about its corresponding hardware component 818 via an I/O signal 616. Solar farm platform and device layer 740 is preferably part of the SCADA software system of solar farm 600, and acts as a bridge between solar farm hardware components 818 and solar farm software system 704. Solar farm platform and device layer 740 installs solar farm hardware components 818 and any associated drivers for solar farm components 818 into solar farm software system 704. Solar farm platform and device layer 740 configures the IP addresses for PLCs 620 and libraries pertaining to PLCs 620, and downloads this configuration to PLCs 620. Solar farm platform and device layer 740 facilitates the communication between solar farm automation server 610, the centralized server of solar farm 600, and PLCs 620, and acts a bridge between the plurality of solar farm hardware components 818 and solar farm software system 704. Solar farm automation server 610 contains real-time data, historical data, and configuration data of solar farm software system 704. In real time, solar farm software system 704 collects data from solar farm hardware components 818 and from solar farm interactive editor 720. Solar farm software system 704 displays the collected data in solar farm GUI 702 (see FIG. 6), where a user can view and manipulate this real-time data as needed. The historical data collected and stored in the historical database can be viewed by a user in solar farm GUI 702 based on user input. Solar farm configuration database 800 maintains solar farm hardware configuration data 812 for the plurality of solar farm hardware components 818. Examples of solar farm configuration data 812 includes, but is not limited to, solar panel number, solar array number, solar inverter number, solar panel type, solar inverter type, IP addresses, and signal names. Solar farm platform and device layer 740 communicates via I/O signal 618 data retrieved from PLCs 620 to solar farm reviser 601. Additionally, solar farm platform and device layer 740 sends instructions from solar farm reviser 601 to the plurality of PLCs 620 via I/O signal 616. I/O signals 618 containing information from solar farm platform and device layer 740 about solar panels 602 and inverters 606 prompts solar farm reviser 601 to create a plurality of real time objects 706, 708, 709, 710 in solar farm software system 704. The technical effect is that when solar farm hardware component 818, such as solar panel 602 is added to solar farm 600, solar farm platform and device layer 740 detects the added solar panel 602 through PLC 620. PLC 620 sends an I/O signal 616 to solar farm platform and device layer 740 and platform and device layer 740 sends I/O signal 618 to solar farm reviser 601. Solar farm reviser 601 creates a plurality of real time objects 706, 708, 709, and 710 at run-time without having to restart or reboot the solar farm software system 704. First real time object 706, second real time object 708, third real time object 709, and $n^{th}$ real time object 710 are images in the solar farm software system 704 that represent plurality of solar farm hardware components a 818, such as solar panels 602. Solar farm reviser 601 updates and communicates with solar farm GUI 702 via I/O signal 609. Solar farm GUI 702 provides a user interface in which plurality of real time objects 706, 708, 709, and 710 of solar farm software system 704 can be viewed or manipulated by the user. Solar farm GUI 702 can be a web-based application or stand-alone application and can include auxiliary devices and interface software.

Figure 6:
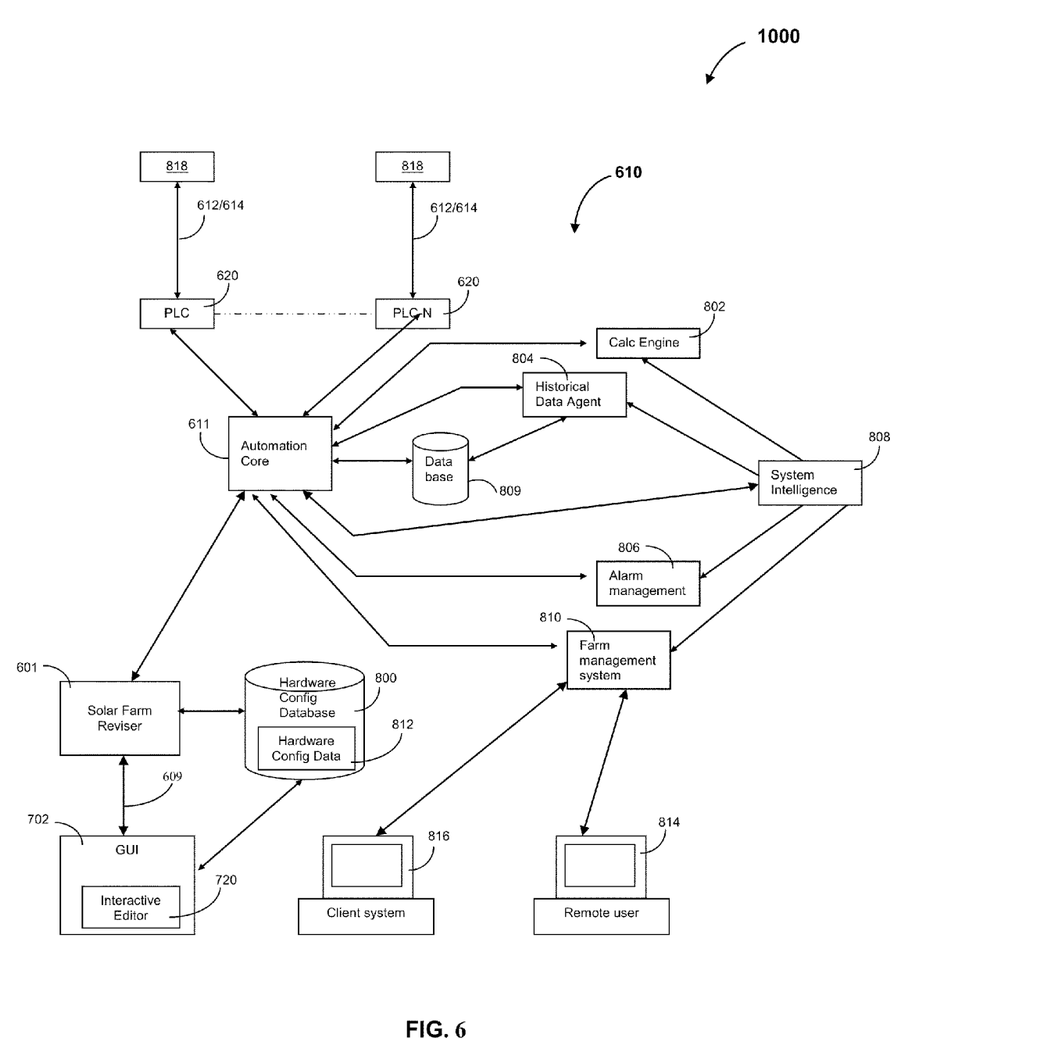
FIG. 6 is a block diagram of an exemplary configuration of the dynamic installation and uninstallation system of a solar farm of the present disclosure.

As shown in FIG. 6, a system 1000 for the dynamic installation or removal of solar farm hardware components 818 into or from a solar farm software system 704 at runtime is provided. System 1000 includes solar farm automation server 610, solar farm reviser 601, at least one solar farm communication device 620, a plurality of real time objects 706, 708, 709, and 710 in the solar farm software system 704, and a plurality of solar farm hardware components 818. Solar farm reviser 601 further includes a solar farm hardware configuration database 800 and a solar farm GUI 702. Solar farm GUI 702 further includes a solar farm interactive editor 720. In the present embodiment, solar farm interactive editor 720 is a touch screen, hand-held wireless device, laptop, desktop computer, or any other device having a keyboard or mouse with an operating system that will allow a user to see a display or display screen to enter, view, and manipulate the real time objects 706, 708, 709, and 710 of solar farm software system 704. The real time objects 706, 708, 709, and 710 are represented in the display of solar farm interactive editor 720 by a graphical depiction or symbol for the appropriate corresponding solar farm hardware component 818 that each real time object represents. Examples of solar farm hardware components 818 include, but are not limited to, solar panels 602, solar arrays 604, inverters 606, sensors, communication devices such as PLCs 620, I/O devices, network switches, and a plurality of solar farm management system components.

In the present embodiment, solar farm automation server 610 further includes an automation core 611, a calculation engine 802, a historical data agent 804, an alarm management 806, a system intelligence 808, a historical database 809, a farm management system 810, a remote user system 814, and a client system 816. Automation core 611 collects the real-time data from the plurality of PLCs 620. Automation core 611 also sends commands to PLCs like start, stop, reset, or fault. Calculation engine 802 uses the raw data from automation core 611 to derive data based on predefined calculations for solar farm 610 such as site power. Historical data agent 804 collects data from PLCs 620 for the plurality of solar panels 602 and stores this data in the historical database 809. System intelligence 808 monitors services of the solar SCADA. If system intelligence 808 detects a failure it sends a signal to alarm management 806, and automatically starts the failure services. Alarm management 806 manages, maintains and acknowledges alarms, alarm states, and events in the solar SCADA. Farm management system 810 manages the integration of the solar farm 600 with the grid, an example of a management function being demand curtailment. Client system 816 is generally a computer having a GUI installed for monitoring and controlling the solar SCADA system. Remote user system 814 allows a remote user (off site) to connect to the solar farm software system 704 through LAN, wireless, modem connection, or other connection means for viewing the Solar SCADA system data.

In the present embodiment, solar farm GUI 702 and solar farm interactive editor 720 are connected to a solar farm hardware configuration database 800. Solar farm hardware configuration database 800 stores, updates, and manages solar farm hardware configuration data 812 that corresponds to the plurality of solar hardware components 818. Examples of solar farm hardware configuration data 812 stored in the solar farm hardware configuration database 800 are: Internet Protocol (IP) address of solar farm hardware component 818, respective data points of the solar farm hardware components 818, and device name and description of solar farm hardware components 818. Solar farm communication device 620 allows the solar farm hardware components 818 to automatically communicate with and update the solar farm hardware configuration database 800 which contains solar farm hardware configuration data 812 for the plurality of solar farm hardware component 818.

In the present embodiment, the plurality of real time objects, i.e., first object 706, second object 708, third object 709, through $n^{th}$ object 710, represent a different solar farm hardware component 818 in the solar farm software system 704, wherein n is any integer. There can be any number of real time objects represented in the solar farm software system 704. Real time objects 706, 708, 709, and 710 are automatically updated by solar farm hardware configuration database 800 whenever there is an addition, change, update, or deletion of solar farm hardware configuration data 812 in the solar farm software system 704. Solar farm reviser 601 provides a user with variety of different avenues to allow the automatic update of solar farm software system 704 at runtime.

In the present embodiment, solar farm interactive editor 720 of solar farm reviser 601 also provides a point where the user can enter, view, and manipulate solar farm hardware configuration data 812. Solar farm interactive editor 720 provides the user with an interface to make additions, modifications, and remove solar farm hardware configuration data 812 that would correspond to an addition, modification, or removal of solar farm hardware component 818.

In the present embodiment, a solar farm hardware component 818, for example a solar panel 602, is added to solar farm 600. To install solar panel 602, a user can select a graphical depiction of solar panel 602 from solar farm interactive editor 720 of solar farm reviser 601 and "add" this solar farm hardware component 818 to solar farm 600. This user action of "adding" solar farm hardware component 818 generates a signal to automatically update solar farm hardware configuration database 800 to read solar farm hardware configuration data 812 for the "added" solar farm hardware component 818. For example, the signal causes solar farm hardware configuration database 800 to look for the IP address for the "added" solar farm hardware component 818. Solar farm hardware configuration database 800 automatically generates a command to update, look for, or create a real time object, for example, first object 706 of solar farm software system 704 that would correspond to the "added" solar farm hardware component 818, here a solar panel 602.

In an alternative embodiment, solar farm hardware component 818, for example a solar panel 602, is "pushed into" solar farm 600 by assigning an IP address to solar panel 602. Solar panel 602 is "pushed into" the system instead of being "added" by a user via solar farm interactive editor 720 of solar farm reviser 601. The IP address allows solar panel 602 to send a signal 612 to solar farm communication device 620, which then sends an update to solar farm hardware configuration database 800 to update solar farm hardware configuration data 812 to show solar panel 602 as being "online" in solar farm software system 704. "Online" is understood to mean that solar panel 602 is available in solar farm software system 704. Solar farm hardware configuration database 800 also updates real time object 706 that corresponds to solar panel 602 in solar farm software system 704 to show that solar panel 602 is "online" in solar farm software system 704. Solar farm hardware configuration database 800 additionally updates solar farm GUI 702 and solar farm interactive editor 720 to display the added solar panel 602 so the user can see the "pushed" solar panel 602 and edit solar panel 602 in solar farm software system 704.

In another alternative embodiment, solar farm hardware component 818 is taken "offline" for maintenance. "Offline" is understood to mean that solar farm hardware component 818 is not available in solar farm software system 704, as such a user cannot monitor or command "offline" solar farm hardware components 818 from solar farm GUI 702. A user takes solar farm hardware component 818 "offline" by selecting the option in solar farm interactive editor 720 of solar farm GUI 702. Solar farm GUI 702 sends update to solar farm hardware configuration database 800, which updates solar farm hardware configuration data 812 that corresponds to that solar farm hardware component 818. Additionally, solar farm hardware configuration database 800 updates the corresponding real time object (i.e., 706, 708, 709, and 710) of solar farm software system 704. Solar farm hardware configuration database 800 also sends a signal via solar farm communication device 620 to bring solar farm hardware component 818 "offline" or to shut down solar farm hardware component 818 for maintenance.

In an additional embodiment, solar farm hardware component 818, is taken "offline" for maintenance at solar farm hardware component 818. Solar farm hardware component 818 sends a signal 612, 614 via solar farm communication device 620 to update solar farm hardware configuration database 800. Solar farm reviser 601 uses the steps set forth above to communicate this change to solar farm software system 704 and update solar farm interactive editor 720 so that the display shows the status to the user.

In another embodiment, solar farm hardware component 818 can be removed from solar farm software system 604. There are at least two ways that the solar farm hardware component 818 can be "removed" from solar farm 600. A user can "remove" the solar farm hardware component 818 from solar farm software system 604 or solar farm hardware component 818 is physically "removed" from solar farm 600. When a user "removes" solar farm hardware component 818 from solar farm software system 604, solar farm interactive editor 720 provides the user with the option to select the level of removal of solar farm hardware component 818. Solar farm interactive editor 720 provides the option of removing solar farm hardware component 818 from system, i.e., when solar farm 600 is decommissioned or solar panels 602 need to be replaced. Solar farm interactive editor 720 also provides the option of removing some characteristics or portions of solar farm hardware component 818. Solar farm reviser 601 allows any changes made by a user to solar farm hardware component 818 in solar farm interactive editor 720 to automatically update solar farm hardware configuration database 800, solar farm hardware configuration data 812, and real time objects 706, 708, 709, and 710 of solar farm software system 704 at runtime.

Additionally, solar farm reviser 601 includes a security level control that provides different user access levels. Solar farm reviser 601 assigns different security clearance and user attributes to different users at sign-on. For example, a system administrator would have greater access to solar farm reviser 601 code and capabilities than a user that is a system operator. Additionally, security levels can be varied based on different job duties and responsibilities at solar farm 600. In an additional embodiment, solar farm reviser 601 can limit the number of solar panels 602, solar arrays 604 or inverters 606 that may be installed into solar farm 600 based on the number of licenses that are available to that site.

Figure 7:
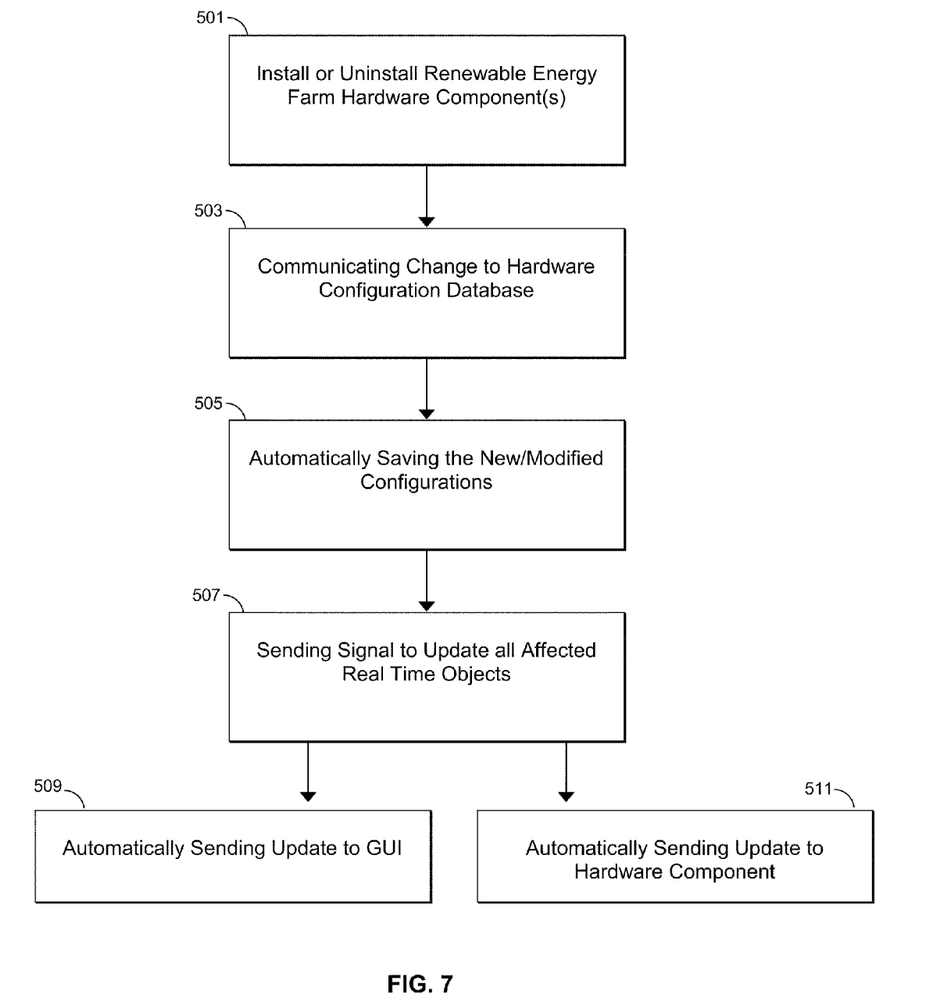
FIG. 7 is a flow chart of a method of dynamic installation or removal of a renewable energy farm hardware component of a wind farm or a solar farm according to an embodiment of the present disclosure.

As shown in FIG. 7, a method using a reviser 201, 601 for dynamically installing or uninstalling renewable energy system hardware component 314, 818 to or from wind farm 200 or solar farm 600 is provided. The method includes a user installing/uninstalling (change) renewable energy system hardware components 314, 818 to/from wind farm 200 or solar farm 600 using interactive editor 320, 720 of GUI 302, 702 (box 501). The change (installation/uninstallation) is communicated to hardware configuration database 300,800 (box 503). Hardware configuration database 300,800 automatically saves the new/modified configuration (change) to hardware configuration data 312, 812 stored in hardware configuration database 300, 800 (box 505). Hardware configuration database 300, 800 automatically sends signals to update real time objects (i.e., 306, 308, 309, 310) of wind farm software system 304 or real time objects (i.e., 706, 708, 709, 710) of solar farm software system 704 to reflect change (box 507). Hardware communication database 300, 800 sends automatic update to GUI 302, 702 to update status in interactive editor 320, 720 (box 509). Hardware communication database 300, 800 automatically sends update via communication device 420, 620 to plurality of hardware components 314, 818 (box 511).

Figure 8:
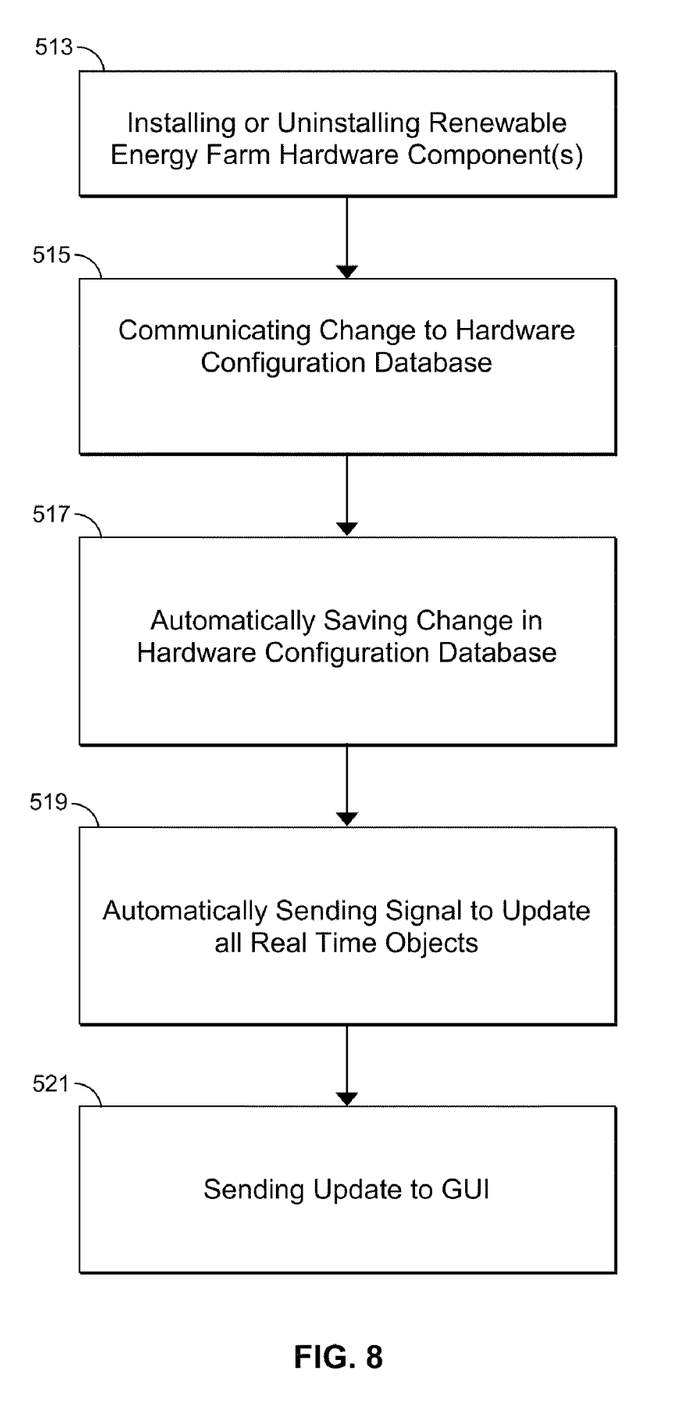
FIG. 8 is a flow chart of an additional method of dynamic installation or removal of a renewable energy farm hardware component of a wind farm or a solar farm according to an embodiment of the present disclosure.

In an alternative embodiment, as shown in FIG. 8, a method for dynamically installing or uninstalling renewable energy system hardware components 314, 818 via a reviser 201, 601 to or from wind farm 200 or solar farm 600 is provided. The method includes a renewable energy system hardware component 314, 818 being added to or removed from wind farm 200 or solar farm 600, respectively (box 513). Renewable energy system hardware component 314, 818 sends a signal to communication device 420, 620 which updates hardware configuration database 300, 800 with the addition/removal (change) (box 515). Hardware configuration database 300, 800 automatically saves change to hardware configuration data 312, 812 stored in hardware configuration database 300, 800 (box 517). Hardware configuration database 300, 800 automatically sends signal to update real time objects (i.e., 306, 308, 309, 310 or 706, 708, 09, and 710) in wind farm software system 304 or solar farm software system 704, respectively, to reflect change (box 519). Hardware configuration database 300, 800 automatically sends update to GUI 302, 702 which displays change in interactive editor 320, 720 which is viewable to the user (box 521).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A system for dynamic installation or uninstallation of a plurality of hardware components of a renewable energy software system, comprising:
   a) a reviser including a hardware configuration database and a graphical user interface, wherein the reviser is adapted to automatically install or uninstall hardware components at runtime without rebooting the renewable energy software system wherein the hardware components are selected from a plurality of wind farm components or a plurality of solar farm components;
   b) at least one communication device adapted to send and receive I/O signals from the plurality of hardware components, wherein the I/O signals include a hardware component status signal, and wherein the at least one communication device is communicably linked to at least one hardware component;
   c) a platform and device layer, wherein the platform and device layer automatically configures and downloads an IP address for the at least one communication device, wherein the platform and device layer is adapted to send and receive I/O signals from the at least one communication device and the hardware configuration database containing hardware configuration data for the plurality of hardware components, wherein the platform and device layer operates as a bridge between the hardware components and the renewable energy software system;
   d) a plurality of real time objects in the renewable energy software system that represent the plurality of hardware components, wherein the plurality of real time objects are automatically created and updated by the hardware configuration database at runtime after receiving the I/O signal from the platform and device layer, wherein the real time objects are created and updated without rebooting the renewable energy software system; and
   e) a historical data agent in the renewable energy software system that collects and represents historical data for each of the plurality of hardware components, wherein the historical data agent provides the collected historical data for each of the of hardware components to a centralized server of the renewable software system, and wherein the historical data agent is automatically updated with any changes to the hardware components by the hardware configuration database at runtime.

2. The system of claim 1, wherein the renewable energy software system is selected from a wind farm software system, a solar farm software system, and combinations thereof.

3. The system of claim 2, wherein the plurality of wind farm components include wind turbines, wind farm hardware microcontrollers, wind farm management system components, and meteorological mast components, and wherein the plurality of solar farm components include a plurality of solar panels in a solar array, at least one inverter, a plurality of programmable logic controllers, and a plurality of solar farm management system components.

4. The system of claim 3, wherein the hardware configuration database stores a plurality of hardware configuration data that correspond to the plurality of wind farm hardware components, solar farm components, and combinations thereof.

5. The system of claim 1, wherein the graphical user interface further includes an interactive editor that allows a user to view and edit the hardware configuration data of the plurality of hardware components.

6. The system of claim 5, wherein the interactive editor provides the user with access to the hardware configuration database to modify the hardware configuration data of the plurality of hardware components to install the plurality of hardware components in a renewable energy software system at runtime.

7. The system of claim 5, wherein the interactive editor provides the user with an option to uninstall the plurality of hardware components from the renewable energy software system at runtime.

8. The system of claim 5, wherein the interactive editor further includes a security level control to limit changes to the hardware configuration data.

9. The system of claim 5, wherein the interactive editor limits the number of hardware components to be installed in the renewable energy software system.

10. A method for dynamic installation of a plurality of renewable energy farm hardware components into a renewable energy software system, comprising:
  a) providing the plurality of hardware components to be installed in a renewable energy farm at runtime, wherein the hardware components are selected from a plurality of wind farm components or a plurality of solar farm components;
  b) providing a reviser, wherein the reviser further includes a hardware configuration database and a graphical user interface in communication with the hardware configuration database, wherein the reviser is adapted to automatically install hardware components at runtime without rebooting the renewable energy software system;
  c) providing at least one communication device adapted to send and receive I/O signals from the plurality of hardware components, wherein the I/O signals include a hardware component status signal, and wherein the at least one communication device is communicably linked to at least one hardware component;
  d) providing a platform and device layer, wherein the platform and device layer automatically configures and downloads an IP address for the at least one communication device, wherein the platform and device layer is adapted to send and receive I/O signals from the at least one communication device and the hardware configuration database containing hardware configuration data for the plurality of hardware components;
  e) providing a historical data agent in the renewable energy software system that collects and represents historical data for each of the plurality of hardware components, wherein the historical data agent provides the collected historical data for each of the of hardware components to a centralized server of the renewable software system, and wherein the historical data agent is automatically updated with any changes to the hardware components by the hardware configuration database at runtime;
  f) sending the hardware component status signal from the communication device to the platform and device layer;
  g) receiving the hardware component status signal at the platform and device layer;
  h) sending the hardware component status signal from the platform and device layer to the hardware configuration database;
  i) receiving the hardware component status signal at the hardware configuration database;
  j) updating a plurality of hardware configuration data that corresponds to the plurality of hardware components in the hardware configuration database based on the hardware component status signal, wherein the hardware configuration database is configured to automatically initiate a change in a plurality of real time objects of the renewable energy software system;
  k) automatically initiating a change in the plurality of real time objects of the renewable energy farm software system to reflect the installation of the plurality of hardware components at runtime; and,
  l) automatically initiating a change in the historical data agent of the renewable energy software system to reflect the installation of the plurality of hardware components at runtime.

11. The method of claim 10, further comprising automatically displaying on the graphical user interface updated information about the plurality of real time objects of the renewable energy software system.

12. The method of claim 10, wherein the graphical user interface further includes an interactive editor, wherein the interactive editor includes at least a computer with a display screen.

13. The method of claim 10, wherein the renewable energy farm is a wind farm, a solar farm, and combinations thereof.

14. The method of claim 10, wherein the wind farm components include wind turbines, hardware microcontrollers, wind farm management system components, and meteorological mast components, and wherein the solar farm components include a plurality of solar panels in a solar array, at least one inverter, a plurality of programmable logic controllers, and a plurality of solar farm management system components.

15. A method for the dynamic uninstallation of a plurality of renewable energy farm hardware components from a renewable energy software system, comprising:
  a) providing a reviser, wherein the reviser further includes a hardware configuration database and a graphical user interface in communication with the hardware configuration database, wherein the reviser is adapted to automatically uninstall hardware components at runtime without rebooting the renewable energy software system, wherein the hardware components are selected from a plurality of wind farm components or a plurality of solar farm components;
  b) providing an option to uninstall the plurality of hardware components through the graphical user interface;
  c) selecting the option to uninstall the plurality of hardware components;
  d) providing at least one communication device to adapted to send and receive I/O signals from the plurality of hardware components, wherein the I/O signals include a hardware component status signal, and wherein the at least one communication device is communicably linked to at least one hardware component;
  e) providing a platform and device layer, wherein the platform and device layer is adapted to send and receive I/O signals from the at least one communication device and the hardware configuration database containing hardware configuration data for the plurality of hardware components, wherein the platform and device layer operates as a bridge between the hardware components and the renewable energy software system;
  f) providing a historical data agent in the renewable energy software system that collects and represents historical data for each of the plurality of hardware components, wherein the historical data agent provides the collected historical data for each of the of hardware components to a centralized server of the renewable software system, and wherein the historical data agent is automatically updated with any changes to the hardware components by the hardware configuration database at runtime;

g) sending the hardware component status signal from the communication device to the platform and device layer;
h) receiving the hardware component status signal at the platform and device layer;
i) sending the hardware component status signal from the platform and device layer to the hardware configuration database;
j) receiving the hardware component status signal at the hardware configuration database;
k) updating hardware configuration data of the hardware configuration database based on the hardware component status signal, wherein the hardware configuration database is configured to automatically initiate a change in a plurality of real time objects of the renewable energy software system; and,
l) automatically initiating a change in the plurality of real time objects of the renewable energy software system to reflect the removal of the plurality of hardware components at runtime.

m) automatically initiating a change in the historical data agent of the renewable energy software system to reflect the removal of the plurality of hardware components at runtime.

16. The method of claim 15, further comprising displaying status information about the plurality of real time objects of the renewable energy software system on the graphical user interface.

17. The method of claim 15, wherein the graphical user interface further includes an interactive editor, wherein the interactive editor provides a user with an option to remove hardware configuration data for the renewable energy farm hardware components being removed from the renewable energy farm software system.

18. The method of claim 15, wherein the renewable energy farm is selected from a wind farm, a solar farm system, and combinations thereof.

* * * * *